US010452519B2

(12) United States Patent
Foster, Jr. et al.

(10) Patent No.: US 10,452,519 B2
(45) Date of Patent: Oct. 22, 2019

(54) INTEGRATED RESOURCE SCHEDULER, CONFIGURATOR, AND VISUALIZER

(71) Applicant: Red Hat, Inc., Raleigh, NC (US)

(72) Inventors: William W. Foster, Jr., Dublin (IE); Kambiz Aghaiepour, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 11 days.

(21) Appl. No.: 15/799,278

(22) Filed: Oct. 31, 2017

(65) Prior Publication Data
US 2019/0129830 A1  May 2, 2019

(51) Int. Cl.
G06F 11/36 (2006.01)
G06F 16/22 (2019.01)
H04L 12/24 (2006.01)
G06Q 10/06 (2012.01)

(52) U.S. Cl.
CPC ...... *G06F 11/3664* (2013.01); *G06F 11/3696* (2013.01); *G06F 16/22* (2019.01); *G06Q 10/06* (2013.01); *H04L 41/08* (2013.01); *H04L 41/085* (2013.01); *H04L 41/0813* (2013.01)

(58) Field of Classification Search
None
See application file for complete search history.

(56) References Cited

U.S. PATENT DOCUMENTS

| 6,779,134 | B1 * | 8/2004 | Laviolette | ........... | G06F 11/3006 |
| | | | | | 714/38.12 |
| 7,475,335 | B2 | 1/2009 | Krishna et al. | | |
| 7,877,680 | B2 | 1/2011 | Arun et al. | | |
| 8,713,135 | B1 * | 4/2014 | Adogla | ............... | H04L 41/0853 |
| | | | | | 709/220 |
| 8,775,577 | B1 * | 7/2014 | Alford | .................... | H04L 67/34 |
| | | | | | 709/221 |
| 2004/0268311 | A1 * | 12/2004 | Pizzoli | .................... | G06F 9/454 |
| | | | | | 717/124 |

(Continued)

FOREIGN PATENT DOCUMENTS

EP    2015511 B1    2/2010

OTHER PUBLICATIONS

Collabnet, "CollabNet CUBIT 2.0 Evaluator's Guide", Sep. 2008.*

(Continued)

*Primary Examiner* — Francisco J Aponte
*Assistant Examiner* — Mark A Gooray
(74) *Attorney, Agent, or Firm* — Withrow & Terranova, PLLC

(57) ABSTRACT

An integrated resource scheduler, configurator and visualizer is disclosed. Allocation information that identifies a configuration state for a respective computing host at a future point in time is received for each respective computing host of a plurality of computing hosts. The allocation information is stored in a schedule data structure. The schedule data structure is automatically monitored over time. Based on a current point in time, it is determined that a computing host of the plurality of computing hosts is to be configured from a current configuration state to a subsequent configuration state identified in the schedule data structure. The computing host is automatically caused to be configured from the current configuration state to the subsequent configuration state.

18 Claims, 10 Drawing Sheets

(56) References Cited

U.S. PATENT DOCUMENTS

| | | | |
|---|---|---|---|
| 2005/0068972 A1* | 3/2005 | Burns | H04L 12/2896 370/412 |
| 2010/0162201 A1* | 6/2010 | Shnaiderman | G06F 8/61 717/101 |
| 2016/0011882 A1 | 1/2016 | Johnson et al. | |
| 2017/0068934 A1 | 3/2017 | Bos | |

OTHER PUBLICATIONS

Author Unknown, "IBM Document Manager," Product Information, IMD11902-USEN-00, Apr. 2007, IBM Corporation, 4 pages.

Author Unknown, "Lenovo XClarity: Simplify and Speed Delivery of IT Infrastructure," Product Information, LYD12360-USEN-03, 2016, Lenovo, 4 pages.

Author Unknown, "Managing Infrastructure and Inventory," Red Hat Customer Portal, Red Hat Cloudforms, Section 4.5, access.redhat.com/documentation/en-us/red_hat_cloudforms/4.5/html-single/managing_infrastructure_and_inventory/, Accessed on Oct. 31, 2017, Red Hat, Inc., 84 pages.

\* cited by examiner

| DYNAMIC INVENTORY 84 | | | | | 68 | |
|---|---|---|---|---|---|---|
| ASSIGNMENTS | SUPPORT | DOCS | USAGE | | | |
| HOSTNAME | SERIAL | MAC | IP | IPMIADDR | WORKLOAD | OWNER |
| CH-11 | S213ADDX44 | 0c:c4:2e:19:82 | 10.12.12.48 | 10.12.12.148 | ENV-1 | JOHNSON |
| CH-12 | S213AEEX44 | 0c:c4:2e:19:83 | 10.12.12.67 | 10.12.12.167 | ENV-1 | JOHNSON |
| CH-13 | S213AEEE44 | 0c:c4:2e:19:84 | 10.12.12.12 | 10.12.12.112 | ENV-2 | JACKSON |
| CH-14 | S213FFFX44 | 0c:c4:2e:19:85 | 10.12.12.38 | 10.12.12.138 | ENV-3 | JENKINS |
| 70 | 72 | 74 | 76 | 78 | 80 | 82 |

*FIG. 5*

ASSIGNMENTS

| NAME | SUMMARY | OWNER | REQUEST | HWFACTS |
|---|---|---|---|---|
| ENV-1 | 10 (PRODUCT 1) | JOHNSON | 29293 | INVENTORY |
| ENV-2 | 24 (PRODUCT 3 TESTING) | JENKINS | 29223 | INVENTORY |
| ENV-3 | 4 (TELEMETRY) | JANSON | 29298 | INVENTORY |
| ENV-4 | 13 (PRODUCT 5 INTEGRATION) | ROBINSON | 29323 | INVENTORY |

FIG. 6

ENV-1

98

| NAME | DATESTARTASSIGNMENT | DATEENDASSIGNMENT | DURATION |
|---|---|---|---|
| CH-11 | 2017-05-20 | 2017-05-28 | 8 DAYS |
| CH-12 | 2017-05-20 | 2017-05-28 | 8 DAYS |
| CH-13 | 2017-05-20 | 2017-05-28 | 8 DAYS |
| CH-14 | 2017-05-20 | 2017-05-28 | 8 DAYS |
| 100 | 102 | 104 | 106 |

*FIG. 7*

HOST OVERVIEW

| NAME | MAIN IP | OS | VIRT | VCPUS | RAM |
|---|---|---|---|---|---|
| CH-I1 | 10.12.12.48 | REDHAT 7.4 | KVM/HOST | 56 | 125.5 |
| CH-I2 | 10.12.12.67 | REDHAT 7.4 | KVM/HOST | 56 | 125.5 |
| CH-I3 | 10.12.12.12 | REDHAT 7.4 | KVM/HOST | 56 | 125.5 |
| CH-I4 | 10.12.12.38 | REDHAT 7.4 | KVM/HOST | 56 | 125.5 |

FIG. 8

INTEGRATED RESOURCE SCHEDULER, CONFIGURATOR, AND VISUALIZER

TECHNICAL FIELD

The examples relate generally to resource scheduling of computing hosts, and in particular to an automated integrated resource scheduler, configurator, and visualizer.

BACKGROUND

A company may maintain a finite number of test computing resources, such as a pool of computing hosts, which can be used for testing purposes by employees. Before a new software release is rolled out to customers, for example, a software development team may want to utilize some of the computing hosts to test the new software release and ensure that the new release is stable. While the development team is using those computing hosts, the computing hosts are unavailable to other employees. Yet, the company may have a high demand by other employees in the company to utilize the computing hosts.

SUMMARY

The examples implement an automated and integrated resource scheduler, configurator, and visualizer. The examples implement mechanisms for maintaining a schedule of a pool of computing resources that identifies future scheduling of the computing resources, and automatically, without human intervention, configures subsets of the computing resources in accordance with the schedule. The examples also automatically maintain information that facilitates visualizations that allow individuals to quickly and intuitively determine the past, present, and future schedule for any particular computing resource. Among other advantages, the examples eliminate a need for one or more humans to monitor a schedule, manually configure computer resources in accordance with the schedule, and generate and maintain information that identifies the schedule.

In one example a method is provided. The method includes receiving, for each respective computing host of a plurality of computing hosts, allocation information that identifies a configuration state for the respective computing host at a future point in time. The method further includes storing, by the computing device, the allocation information in a schedule data structure. The method further includes automatically monitoring the schedule data structure over time. The method further includes, based on a current point in time, determining that a computing host of the plurality of computing hosts is to be configured from a current configuration state to a subsequent configuration state identified in the schedule data structure, and automatically causing the computing host to be configured from the current configuration state to the subsequent configuration state.

In another example a computing device is provided. The computing device includes a memory and a processor device coupled to the memory. The processor device is to receive, for each respective computing host of a plurality of computing hosts, allocation information that identifies a configuration state for the respective computing host at a future point in time. The processor device is further to store the allocation information in a schedule data structure. The processor device is further to automatically monitor the schedule data structure over time. The processor device is further to, based on a current point in time, determine that a computing host of the plurality of computing hosts is to be configured from a current configuration state to a subsequent configuration state identified in the schedule data structure, and automatically cause the computing host to be configured from the current configuration state to the subsequent configuration state.

In another example a computer program product is provided. The computer program product is stored on a non-transitory computer-readable storage medium and includes instructions to cause a processor device to receive, for each respective computing host of a plurality of computing hosts, allocation information that identifies a configuration state for the respective computing host at a future point in time. The instructions further cause the processor device to store the allocation information in a schedule data structure. The instructions further cause the processor device to automatically monitor the schedule data structure over time. The instructions further cause the processor device to, based on a current point in time, determine that a computing host of the plurality of computing hosts is to be configured from a current configuration state to a subsequent configuration state identified in the schedule data structure, and automatically cause the computing host to be configured from the current configuration state to the subsequent configuration state.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 5 is a diagram of a user interface that depicts certain inventory information according to one example;

FIG. 6 is a diagram of a user interface that may be presented in response to a selection of an assignments control presented in the user interface illustrated in FIG. 5;

FIG. 7 is a diagram of a user interface that may be presented in response to a selection of a name of one of the test environments presented in the user interface illustrated in FIG. 6;

FIG. 8 is a diagram of a user interface that may be presented in response to a selection of an "INVENTORY" link of one of the test environments presented in the user interface illustrated in FIG. 6;

DETAILED DESCRIPTION

Figure 1:
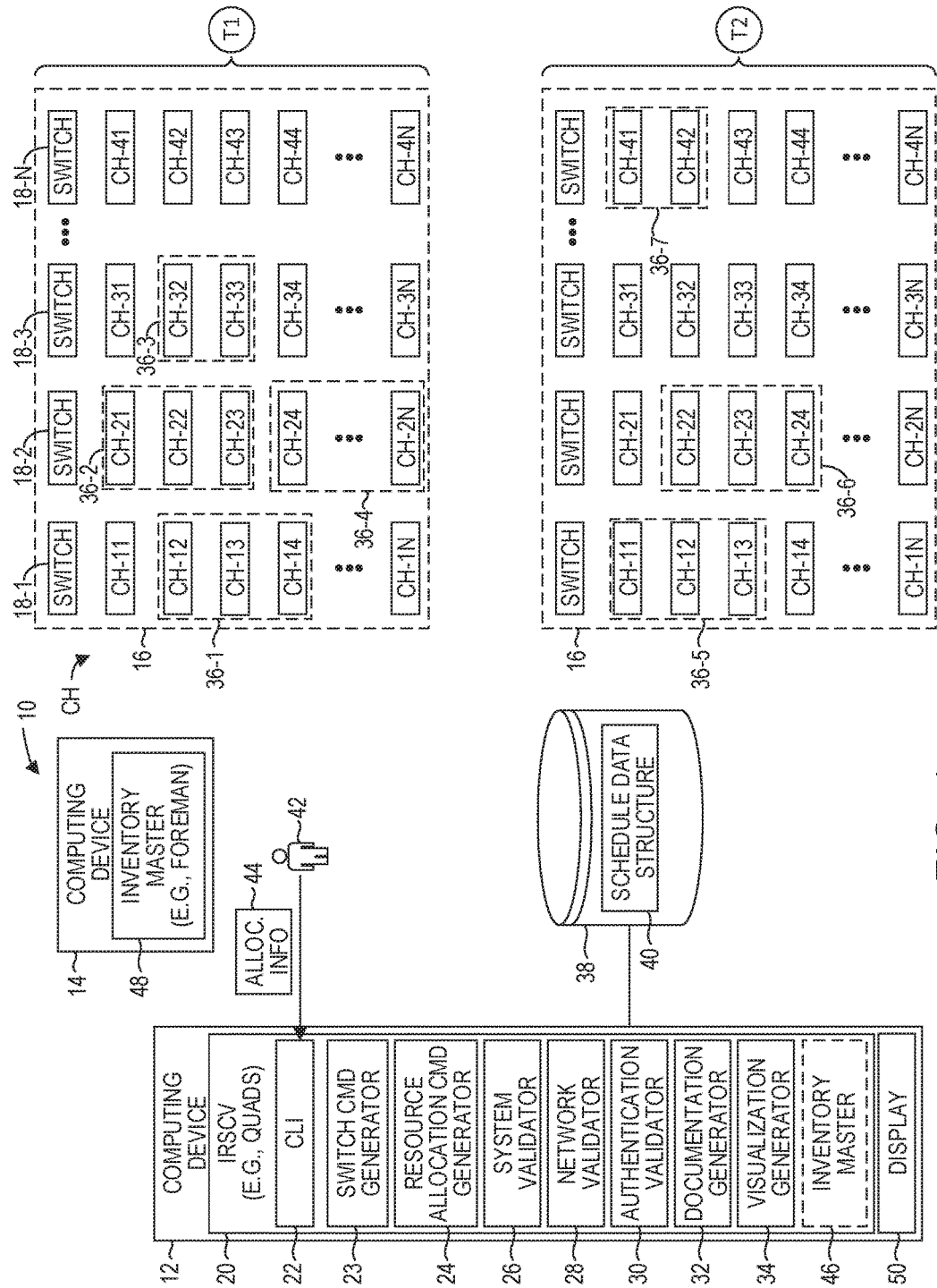
FIG. 1 is block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first test environment" and "second test environment," and does not imply a priority, a type, an importance, or other attribute, unless otherwise stated herein. As used herein and in the claims, the articles "a" and "an" in reference to an element refers to "one or more" of the element unless otherwise explicitly specified. As used throughout the specification and claims, the term "automatically" refers to functionality that is performed without direct initiation by or direct involvement from a human.

A company may maintain a finite number of test computing resources, such as a pool of computing hosts, which can be used for testing purposes by employees. Before a new software release is rolled out to customers, for example, a software development team may want to utilize some of the computing hosts to test the new software release and ensure that the new release is stable. While the development team is using those computing hosts, the computing hosts are unavailable to other employees. Yet, the company may have a high demand by other employees in the company to utilize the computing hosts.

Configuring the pool of computing resources into multiple different test environments in response to the demands of teams of employees requires a substantial and rapid amount of configuration of computing hosts and network equipment for each new test environment. In a large research and development context, such as in the context of a software development company, the pool of computing resources may include hundreds of computing hosts, and hundreds of network switches, many of which may need to be configured for each new test environment. This requires substantial manpower. Moreover, with such a large, diverse, and changing environment, there is also a chance of human error caused by the substantial amount of configuration changes that are constantly needed.

In addition to the need to be able to relatively rapidly provide a team of employees with a test environment, a schedule must be maintained so that a particular computing host is not inadvertently scheduled for multiple different test environments at the same time, and so that it can be determined which computing hosts may be available for use in a new test environment.

Up-to-date documentation that identifies the state of each computing resource is also important. Maintaining up-to-date documentation for hundreds of computing hosts and hundreds of network switches is very time-consuming.

All these requirements result in a need for a relatively large team of operators to maintain the pool of computing resources, configure the pool as needed, and maintain the documentation. In addition to the cost of a large team of operators, from a practical standpoint, it is unlikely that the operators will consistently enter the hundreds or thousands of configuration commands accurately, will maintain a large schedule accurately, or will maintain accurate documentation for hundreds of computing resources and network switches.

The examples implement an automated and integrated resource scheduler, configurator, and visualizer. The examples implement mechanisms for maintaining a schedule for a pool of computing resources that identifies future scheduling of the computing resources, and that automatically, without human intervention, configures subsets of the computing resources in accordance with the schedule. The examples also automatically maintain information that facilitates visualizations that allow individuals to quickly and intuitively determine the past, present, and future schedule for any particular computing resource. The examples also maintain up-to-date and accurate documentation that identifies a current configuration state of each computing host in the pool of computing resources. Among other advantages, the examples eliminate a need for one or more humans to monitor a schedule, manually configure computer resources in accordance with the schedule, and generate and maintain information that identifies the schedule. The examples also greatly reduce the manpower required to implement test environments from a pool of computing resources and ensure that each test environment is configured accurately at the precise time identified in the schedule.

FIG. 1 is block diagram of an environment 10 in which examples disclosed herein may be practiced. The environment 10 includes a computing device 12, a computing device 14, and a pool 16 of a plurality of computing resources, including a plurality of computing hosts CH and one or more switches 18. Individual computing hosts CH will be referred to by the labels in the drawings, such as the computing host CH-11 or the computing host CH-12. The pool 16 also includes a plurality of switches 18 that facilitate interconnection between the computing hosts CH, and which can be programmatically configured to implement local area networks, including virtual local area networks (VLANs), among the computing hosts CH as desired. In some examples, each switch 18 may be communicatively connected to each other switch 18, and may be directly connected to the computing hosts CH that are in the same rack as the respective switch 18. For example, the switch 18-1 and computing hosts CH-11, CH-12, CH-13, and CH-14-CH-1N may be in one rack, and the switch 18-1 and the computing hosts CH-11, CH-12, CH-13, and CH-14-CH-1N may be physically connected to one another. As another example, the switch 18-2 and the computing hosts CH-21, CH-22, CH-23, and CH-24-CH-2N may be in a different rack, and the switch 18-2 and the computing hosts CH-21, CH-22, CH-23, and CH-24-CH-2N may be physically connected to one another.

While for purposes of illustration and relative simplicity only twenty computing hosts CH are illustrated, the examples have applicability to pools of any number of computing hosts CH, such as hundreds or thousands of computing hosts CH. In the present examples, each computing host CH is a separate physical "bare machine," but the examples are not limited to bare machine computing resources.

The computing device 12 includes an integrated resource scheduler, configurator, and visualizer (IRSCV) 20 according to one example. As will be discussed in detail herein, the IRSCV 20 allows for the scheduling of and subsequent automated generation of test environments of computing resources from the pool 16 of computing resources to facilitate testing of, for example, software products. In some examples, the IRSCV 20 may be based on the quick and dirty scheduler (QUADS) available at github.com/redhat-performance/quads, with the additional functionality discussed herein.

Solely for purposes of illustration, the IRSCV 20 will be discussed herein in terms of functional processes, including, for example, a command line interface (CLI) 22, a switch command generator 23, a resource allocation command generator 24, a system validator 26, a network validator 28, an authentication validator 30, a documentation generator 32, and a visualization generator 34. However, these functional processes are illustrated merely for discussing the overall functionality of the IRSCV 20, and it will be apparent that the functionality discussed herein could be implemented in any number of functional processes and that the examples are not limited to the particular functional processes discussed herein.

Additionally, because the IRSCV 20 is a component of the computing device 12, functionality implemented by the IRSCV 20 may be attributed herein to the computing device 12 generally. Moreover, in examples where the IRSCV 20 comprises software instructions that program a processor device to carry out functionality discussed herein, functionality implemented by the IRSCV 20 may be attributed herein to such processor device.

The pool 16 of computing resources is illustrated in FIG. 1 at two different points in time, a time T1 and a time T2. At the time T1, the pool 16 of computing resources includes four test environments 36-1, 36-2, 36-3 and 36-4 (generally, test environments 36). Each test environment 36 includes one or more computing hosts CH, and associated networking resources from one or more of the switches 18. At the subsequent point in time T2, the pool 16 of computing resources includes three test environments 36-5, 36-6, and 36-7.

A storage device 38 maintains a schedule data structure 40 that identifies how the pool 16 will be configured at any given time. The IRSCV 20 maintains the schedule data structure 40, automatically monitors the schedule data structure 40, and at the times identified in the schedule data structure 40, causes the computing resources in the pool 16 to be configured to generate new test environments 36 in accordance with the schedule data structure 40. The monitoring of the schedule data structure 40 and configuration of the new test environments 36 occurs automatically, greatly reducing the amount of personnel needed to maintain the pool 16 of computing resources. Automatic generation of the test environments 36 also ensures that individuals awaiting the creation of a test environment 36 will be provided the test environment 36 at the time the test environment 36 was scheduled to be created, and also ensures that employees who are currently utilizing the test environments 36 do not utilize the test environments 36 longer than scheduled.

Details of the IRSCV 20 according to some examples will now be discussed. A user, such as an operator 42, utilizes the CLI 22 to input allocation information 44 to the IRSCV 20. The allocation information 44 identifies a future configuration state of one or more of the computing resources in the pool 16. For example, the allocation information 44 may identify a particular computing host CH, a name of the test environment 36 to which the particular computing host CH will be assigned, an assignment start time, such as a time and date that the test environment 36 is to be automatically generated, and an assignment end time, such as a time and date that the test environment 36 will terminate. The allocation information 44 may also identify VLANs that should be generated for the test environment 36, user identifiers and passwords that are to be generated to limit access to the test environment 36, and any other relevant information associated with the test environment 36. Allocation information 44 may also include one or more of the following: credentials of the switches 18, media access control (MAC) addresses of physical host network interfaces, identifiers of the physical switch ports to which the MAC addresses are connected, a name of each computing host CH, MAC addresses of the provisioning interface of each computing host CH, a network of each computing host CH, a subnet of each computing host CH, and a desired operating system to be loaded onto each computing host CH.

The IRSCV 20 may perform certain validations, such as to ensure that the identified computing host CH is available over the requested designated time period. The IRSCV 20 then stores the information in the schedule data structure 40 in association with the particular computing host CH. The allocation information 44 may identify multiple computing hosts CH to be assigned to the test environment 36, or the operator 42 may enter multiple instances of allocation information 44, each corresponding to a particular computing host CH.

The IRSCV 20 continually monitors the schedule data structure 40 to determine if the current point in time matches any time identified in the schedule data structure 40. The IRSCV 20 may monitor the schedule data structure 40 periodically, such as every minute, every five minutes, every ten minutes, or any other desirable period.

Upon determining that a time identified in the schedule data structure 40 has arrived, the IRSCV 20 causes the computing host(s) CH to be configured from their current configuration state to the configuration state identified in the schedule data structure 40. The IRSCV 20 may cause the configuration in a number of different ways. In one example, the IRSCV 20 includes an inventory master 46 which maintains the pool 16 of computing resources. The inventory master 46 may, for example, be capable of implementing desired operating systems on the computing hosts CH, implementing user identifier and password security, and the like. In such examples, the IRSCV 20 causes the configuration of the computing hosts CH via the integrated inventory master 46, which communicates a plurality of commands to the computing hosts CH and the switches 18 to implement the desired configuration states and thereby generate the scheduled test environment 36.

In another example, the IRSCV 20 sends a command to an external inventory master 48 that is responsible for configuring the computing resources in the pool 16 in response to commands from the IRSCV 20. In one example the external inventory master 48 comprises the Foreman lifecycle management tool, available at www.theforeman.org; however, the examples are not limited to any particular external inventory master 48. The IRSCV 20 may communicate the commands to the inventory master 48 via any suitable interprogram communication mechanism, such as via an application programming interface (API), or the like. Commands that the inventory master 48 may be directed to do include removing a prior host "role" of the respective computing host CH, adding a current "role" that corresponds to the right user views/permissions for the current test environment 36, and changing cloud users. Commands may direct the inventory master 48 to provision a computing host CH with a particular operating system, and install on the computing host CH a particular network configuration.

For purposes of illustration, the IRSCV 20 will be illustrated in conjunction with the external inventory master 48 rather than the inventory master 46. Based on the network information provided in the allocation information 44, the switch command generator 23 sends commands to one or more of the switches 18 to programmatically set up the appropriate switch ports with the appropriate computing hosts CH. This may involve setting up VLANS among the appropriate computing hosts CH. Based on the information in the schedule data structure 40, the resource allocation command generator 24 generates a plurality of commands that direct the inventory master 48 to configure the relevant computing hosts CH in the pool 16.

The system validator 26 validates that the inventory master 48 has in fact configured the computing hosts CH in accordance with the commands. In one example where the inventory master 48 is the Foreman lifecycle management tool, the system validator 26 requests, from the inventory master 48, a build state of the respective computing host CH. If the inventory master 48 identifies the build state as being false, the system validator 26 identifies the respective computing host CH as being properly configured. If the inventory master 48 identifies the build state as being true, the system validator 26 identifies the respective computing host CH as being in the process of being configured.

The network validator 28 ensures that the network interfaces associated with the computing hosts CH in the test environment 36 have been properly configured with the allocated IP addresses for the computing hosts CH. In one example, the network validator 28 sends a ping command to each allocated internet protocol (IP) address associated with the test environment 36. If the network validator 28 receives a response to the ping command, the network validator 28 determines that the allocated IP address has been properly set up. If the network validator 28 does not receive a response to the ping command, the network validator 28 may, for example, generate and present an alert to the operator 42 on a display 50 indicating that the allocated IP address has not been properly configured in the computing host CH.

The authentication validator 30 ensures that designated user identifiers and passwords have been generated to limit access to the computing hosts CH in the new test environment 36. In one example, the authentication validator 30 sends a series of commands to a computing host CH in the test environment 36, each command using a designated user identifier and password. If the respective command associated with a particular user identifier and password is successfully processed by the computing host CH, the authentication validator 30 determines that the particular user identifier and password have been properly configured to limit access. If the respective command associated with a particular user identifier and password is not successfully processed by the computing host CH, the authentication validator 30 may, for example, generate and present an alert to the operator 42 on the display 50 indicating that the particular user identifier and password have not been properly configured.

The documentation generator 32 automatically and periodically analyzes the schedule data structure 40 and requests information from the inventory master 48 to generate documentation that identifies the configuration state of the computing resources in the pool 16. This allows individuals, such as the operator 42, to quickly and intuitively see configuration information about the computing hosts CH, the switches 18, and the test environments 36 on demand. Because the documentation is generated automatically and repeatedly, the operator 42 is presented with accurate, up-to-date documentation. Details of the documentation generator 32 will be discussed below.

The visualization generator 34 automatically and periodically analyzes the schedule data structure 40 to generate visualizations, such as images, that allow the operator 42 to quickly and intuitively view the status of the resources in the pool 16, either in the past, the present, or the future. Examples of visualizations generated by the visualization generator 34 will be discussed below.

Figure 2:
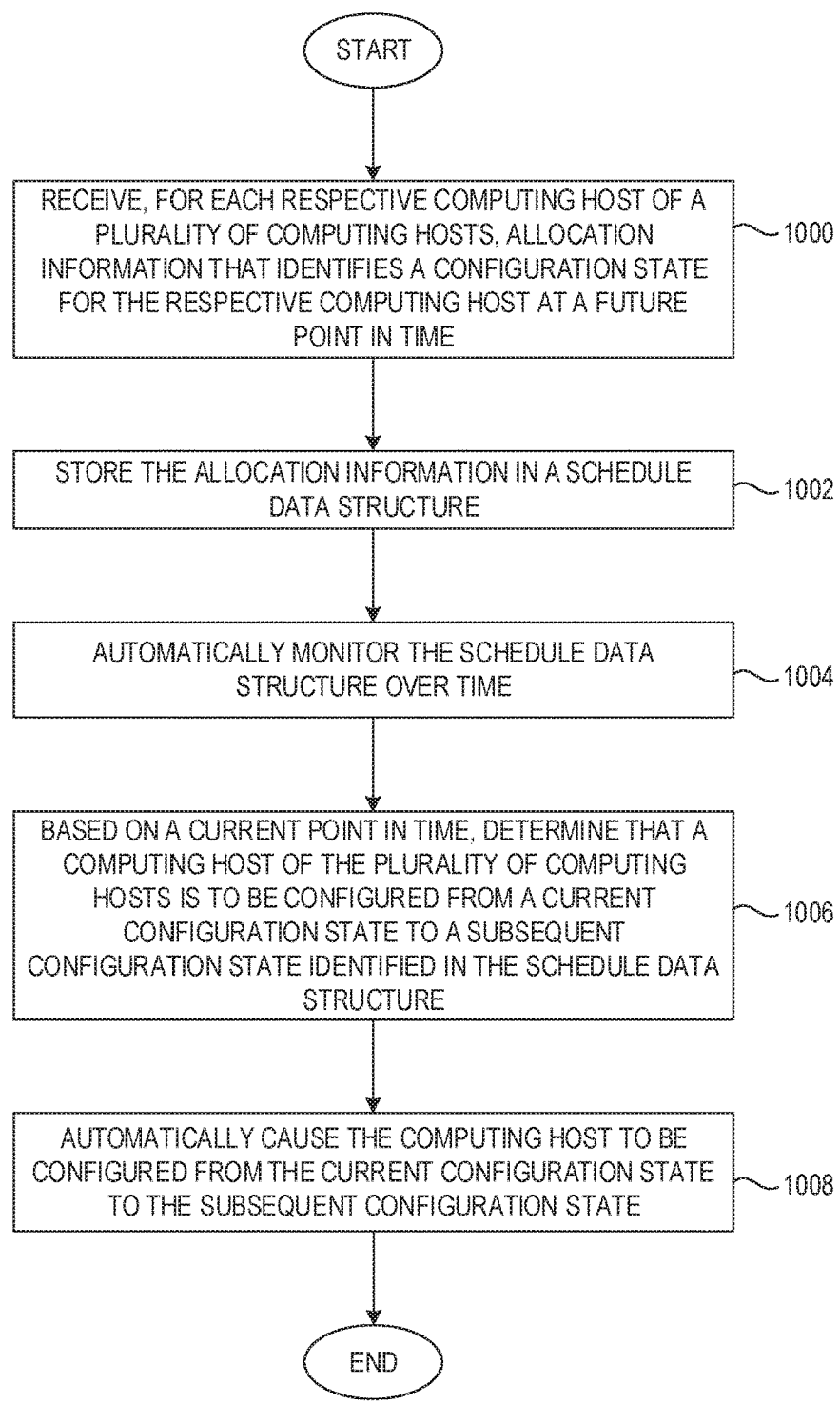
FIG. 2 is a flowchart of a method for automatically generating a test environment according to one example.

FIG. 2 is a flowchart of a method for automatically generating a test environment 36 according to one example. FIG. 2 will be discussed in conjunction with FIG. 1. The IRSCV 20 receives from the operator 42, for each respective computing host CH of a plurality of computing hosts CH, allocation information 44 that identifies a configuration state for the respective computing host CH at a future point in time (FIG. 2, block 1000). For example, referring to FIG. 1, at a time prior to time T2, the IRSCV 20 may receive, for the subset of computing hosts CH-11, CH-12, and CH-13, allocation information 44 that identifies a future configuration state for the subset of computing hosts CH-11, CH-12, and CH-13 sufficient to form the test environment 36-5 at time T2. The IRSCV 20 stores the allocation information 44 in the schedule data structure 40 (FIG. 2, block 1002). The IRSCV 20 automatically monitors the schedule data structure 40 over time (FIG. 2, block 1004). Based on a current point in time, such as at the time T2, the IRSCV 20 determines that the subset of computing hosts CH-11, CH-12, an CH-13 of the plurality of computing hosts CH are to be configured from a current configuration state to a subsequent configuration state identified in the schedule data structure 40 to form the test environment 36-5 (FIG. 2, block 1006). The IRSCV 20 automatically causes the computing hosts CH-11, CH-12, and CH-13 to be configured from the current configuration state to the subsequent configuration state (FIG. 2, block 1008).

Figure 3:
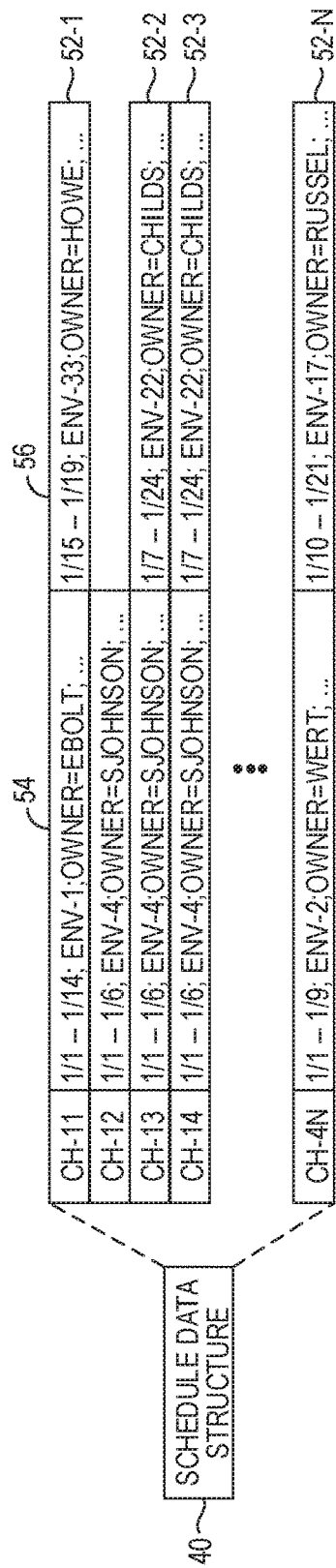
FIG. 3 is a diagram of an example schedule data structure.

FIG. 3 is a diagram of an example schedule data structure 40. The example schedule data structure 40 includes an entry 52 for each computing host CH in the pool 16. Solely for purposes of illustration, only four entries 52-1-52-N, which correspond respectively to computing hosts CH-11, CH-13, CH-14, and CH-4N, are shown. The entries 52-1-52-N are illustrative only, and may not be consistent with test environments 36 illustrating the computing hosts CH-11, CH-13, CH-14, and CH-4N in other figures herein. The entry 52-1 contains a test environment record 54 that indicates that the computing host CH-11, on January 1, is to be configured to be part of a test environment 36 called "ENV-1" that is associated with an owner named "EBOLT."

The entry 52-1 also contains a test environment record 56 that indicates the computing host CH-11, on January 15, is to be configured to be part of a test environment 36 called "ENV-33" that is associated with an owner named "HOWE." Thus, on January 15, the IRSCV 20 will automatically detect that the computing host CH-11 is to be configured from a current configuration state to the configuration state identified in the test environment record 56, and perform the processing, as discussed above with regard to FIGS. 1 and 2, to cause the computing host CH-11 to be configured to such configuration state, without human involvement or input. While only two test environment records 54, 56 are illustrated, it should be apparent that any number of test environment records 54, 56 may be associated with the computing host CH-11.

Each entry 52 may include additional configuration information, such as, by way of non-limiting example, the current test environment 36 to which the computing host CH belongs, network interfaces on the computing host CH, and a default test environment 36 to which the computing host CH is assigned if not otherwise assigned to a particular test environment 36.

The schedule data structure 40 may also include an entry for each test environment 36. Each such entry may include, for example, a name of the test environment 36, a creation time of the test environment 36, identifiers of users who receive notifications, a description of the test environment 36, an owner of the test environment 36, a particular VLAN design of the test environment 36, and a ticket number associated with the creation of the test environment 36.

Figure 4:
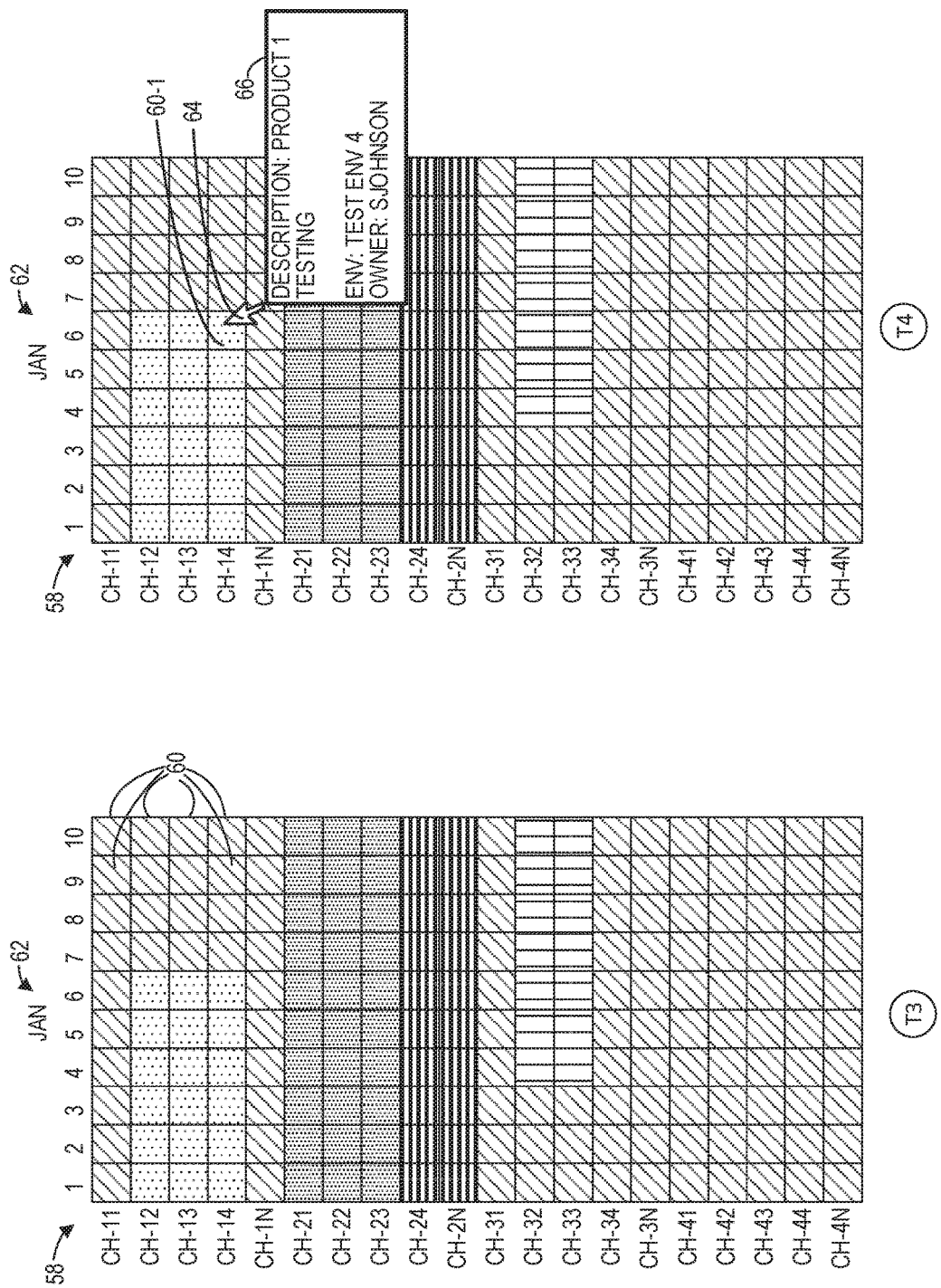
FIG. 4 is a diagram of a heat-map visualization image that visually depicts a configuration state of computing hosts according to one example.

FIG. 4 is a diagram of a heat-map visualization image 58 that visually depicts schedule information for the computing hosts CH at two successive periods of time T3 and T4, according to one example. The heat-map visualization image 58 is generated by the visualization generator 34 (FIG. 1). In particular, the visualization generator 34 periodically, such as each minute, every five minutes, every few seconds, or any other desirable period, analyzes the schedule data structure 40 and forms the heat-map visualization image 58 based on the schedule data structure 40. The heat-map visualization image 58 includes a grid of cells 60. Each cell 60 represents a computing host CH on a particular date. The heat-map visualization image 58 also includes date information 62 that identifies the particular date associated with each cell 60 in the grid of cells 60. Each cell 60 has a unique visual characteristic based on a test environment 36 with which the corresponding computing host CH is associated on the corresponding particular date. For example, the cells 60 of each computing host CH that is assigned to a particular test environment 36 may be the same color, have the same pattern, or some other visually distinguishing characteristic. In this example, the heat-map visualization image 58 indicates that computing hosts CH-12, CH-13, and CH-14 are part of a test environment 36 from January 1 through January 6. Computing hosts CH-21, CH-22 and CH-23 are part of a test environment 36 from January 1 through January 10. Computing hosts CH-24 and CH-2N are part of a test environment 36 from January 1 through January 10. Computing hosts CH-32 and CH-33 are part of a test environment 36 from January 4 through January 10.

At a time T4, the operator 42 hovers a cursor 64 controlled by an input device over a cell 60-1 associated with the computing host CH-14 on January 6. In response to the selection of the cell 60-1, the heat-map visualization image 58 displays a text box 66 that identifies the textual description ("PRODUCT 1 TESTING") of the test environment 36 with which the computing host CH-14 will be used on January 6, the name ("TEST ENV 4") of the test environment 36, and the owner ("SJOHNSON") of the test environment 36.

The documentation generator 32 maintains up-to-date inventory data that identifies current configuration information relating to the pool 16 of resources. The inventory data may be presented in one or more user interfaces upon request by the operator 42.

FIG. 5 is a diagram of a user interface 68 that depicts certain inventory information according to one example. To maintain inventory data, the documentation generator 32 periodically, such as each minute, every five minutes, every few seconds, or any other desirable period, generates the user interface 68 based on data from several sources. It is noted that while for purposes of illustration the user interface 68 contains documentation about only four computing hosts CH-11-CH-14, in practice, the user interface 68 may contain information about each computing host CH in the pool 16 of resources.

In one example, once each period, the documentation generator 32 queries the inventory master 48 to determine the name of each computing host CH, the MAC address and main IP address of each computing host CH, and the MAC address and IP address of the intelligent platform management interface (IPMI)/out-of-band interface for each computing host CH. The documentation generator 32 also queries data maintained by the IRSCV 20 to determine for each computing host CH which test environment 36 the computing host CH belongs to and to which owner the computing host CH currently belongs. The documentation generator 32 also queries data maintained by the IRSCV 20 to determine the name, description, status, and computing host CH count of each test environment 36; the start time, end time, total duration, and remaining time in each test environment 36; and the ticket number and owner of each test environment 36.

While the layout of the user interface 68 may differ depending on system design, in this example the user interface 68 contains a column 70 that identifies each computing host CH by hostname. A column 72 identifies the serial number of each computing host CH. A column 74 identifies the MAC address of each computing host CH. A column 76 identifies the IP address of each computing host CH. A column 78 identifies the IP address of the IPMI/out-of-band interface of each computing host CH. A column 80 identifies the name of the test environment 36 to which the computing host CH is currently assigned. A column 82 identifies the current owner of the computing host CH.

The user interface 68 may also include one or more selectable controls 84, including an assignments control 84, that allows the operator 42 to view additional inventory data.

FIG. 6 is a diagram of a user interface 86 that may be presented in response to a selection of the assignments control 84. The user interface 86 contains a column 88 that identifies the name of each active test environment 36. The name of each active test environment 36 may be user selectable to obtain more information about the particular active test environment 36. A column 90 identifies, for each active test environment 36, the number of computing hosts CH in the active test environment 36, and the name of the active test environment 36. A column 92 identifies the owner of each active test environment 36. A column 94 identifies a number of the request that established each active test environment 36. A column 96 contains a clickable "INVENTORY" link that, when selected, presents a user interface with additional information regarding each computing host CH in the respective test environment 36. The user interface 86 may color code the word "INVENTORY" to identify a status of the test environment 36. For example, the color green may be used to indicate that the test environment 36 is ready or active. The color red may be used to indicate that the test environment 36 is being validated or is not ready.

FIG. 7 is a diagram of a user interface 98 that may be presented in response to a selection of a name of one of the test environments 36 presented in the user interface 86 illustrated in FIG. 6. In this example, the name "ENV-1" was selected. The user interface 98 contains a column 100 that identifies each computing host CH in the selected test environment 36. A column 102 identifies the start date assignment for each computing host CH in the selected test environment 36. A column 104 identifies the end date assignment for each computing host CH in the selected test environment 36. A column 106 identifies the duration of the assignment for each computing host CH in the selected test environment 36.

FIG. 8 is a diagram of a user interface 108 that may be presented in response to a selection of an INVENTORY link of one of the test environments 36 presented in the user interface 86 illustrated in FIG. 6. In this example, the INVENTORY link of the test environment 36 named "ENV-1" was selected. The user interface 108 contains a plurality of selectable buttons 110 which control which columns of information are presented in the user interface 108. The selectable buttons 110 may be selected or deselected to add or remove columns of information in real-time. In this example, selectable buttons 110-1-110-6 have been selected by the operator 42, or, in some examples, the selectable buttons 110-1-110-6, or some other selection of the selectable buttons 110, may be the default settings such that by default the information associated with the selectable buttons 110-1-110-6 are initially presented to the operator 42. A column 112 identifies the name of each computing host CH in the selected test environment 36. A column 114 identifies the main IP address of each computing host CH in the selected test environment 36. A column 116 identifies the current operating system of each computing host CH in the selected test environment 36. A column 118 identifies the current virtual machine technology used on each computing host CH in the selected test environment 36. A column 120 identifies the number of virtual CPUs offered by each computing host CH in the selected test environment 36. A column 122 identifies the amount of physical RAM of each computing host CH in the selected test environment 36.

Collectively, the user interfaces illustrated in FIGS. 5-8 depict various aspects of the dynamic inventory that is repeatedly automatically generated and maintained by the documentation generator 32, and presented to the operator 42, or another suitable user, upon request.

Figure 9:
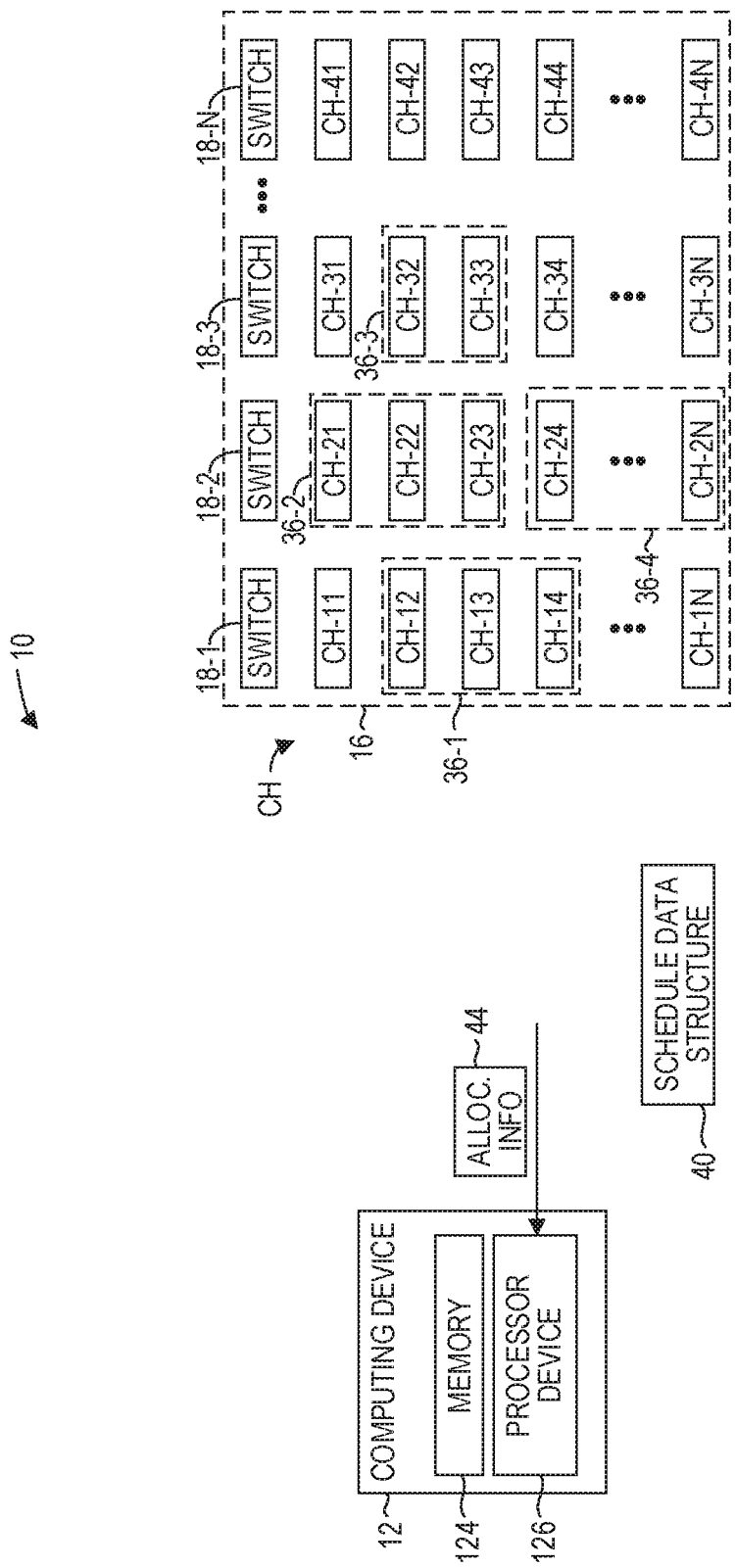
FIG. 9 is a simplified block diagram of the environment illustrated in FIG. 1 according to another example.

FIG. 9 is a simplified block diagram of the environment 10 illustrated in FIG. 1 according to another example. In this example, the computing device 12 includes a memory 124 and a processor device 126. The processor device 126 is coupled to the memory 124 to receive, for each respective computing host CH of the plurality of computing hosts CH, allocation information 44 that identifies a configuration state for the respective computing host CH at a future point in time. The processor device 126 stores the allocation information 44 in the schedule data structure 40. The processor device 126 automatically monitors the schedule data structure 40 over time. The processor device 126, based on a current point in time, determines that a computing host CH of the plurality of computing hosts CH is to be configured from a current configuration state to a subsequent configuration state identified in the schedule data structure 40. The processor device 126 automatically causes the computing host CH to be configured from the current configuration state to the subsequent configuration state.

Figure 10:
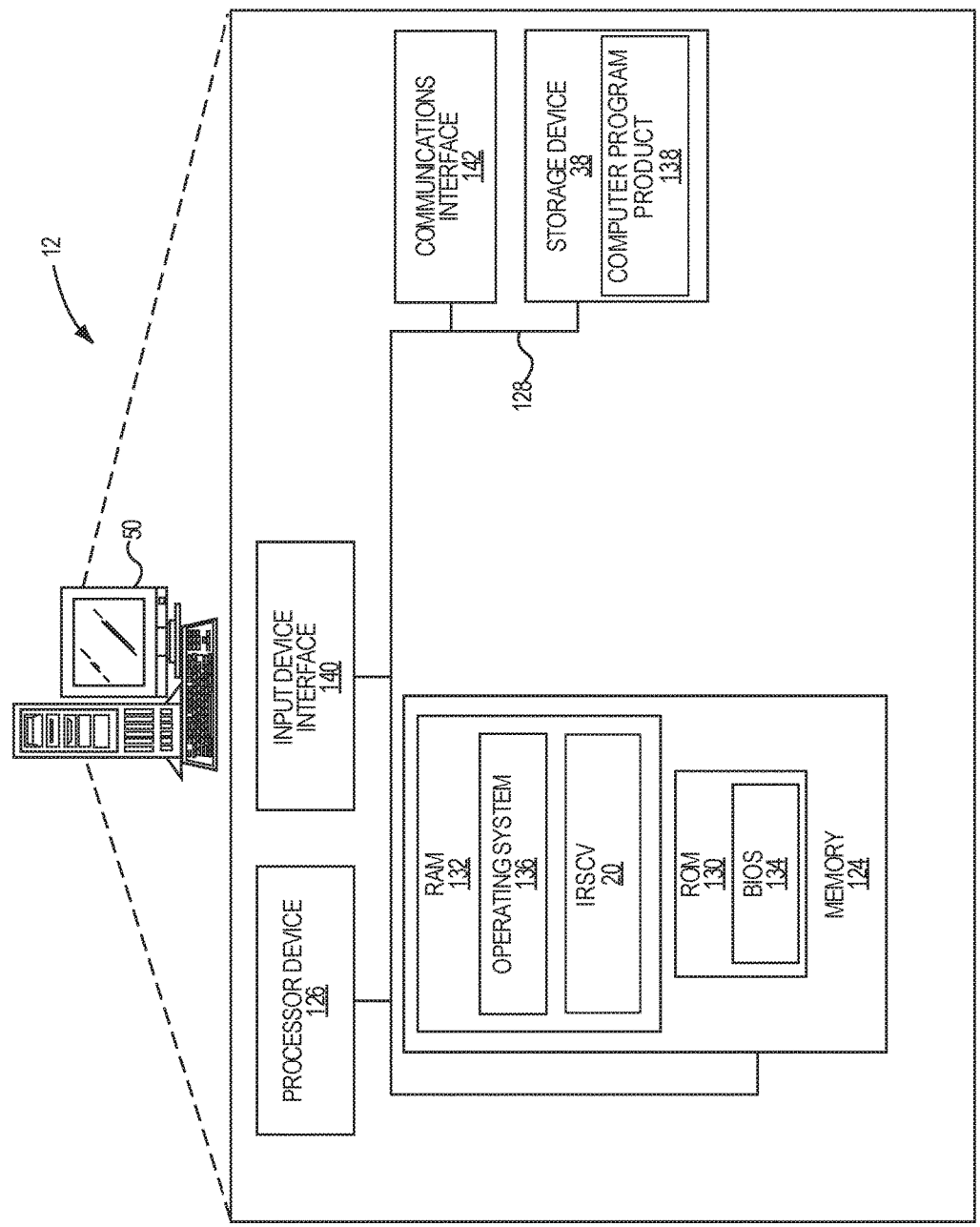
FIG. 10 is a block diagram of a computing device suitable for implementing examples according to one example.

FIG. 10 is a block diagram of the computing device 12 suitable for implementing examples according to one example. The computing device 12 may comprise any one or more computing or electronic devices capable of including firmware, hardware, and/or executing software instructions to implement the functionality described herein, such as a computer server, a desktop computing device, a laptop computing device, a virtual machine executing on a server computing device, or the like. The computing device 12 includes the processor device 126, the memory 124, and a system bus 128. The system bus 128 provides an interface for system components including, but not limited to, the memory 124 and the processor device 126. The processor device 126 can be any commercially available or proprietary processor.

The system bus 128 may be any of several types of bus structures that may further interconnect to a memory bus (with or without a memory controller), a peripheral bus, and/or a local bus using any of a variety of commercially available bus architectures. The memory 124 may include non-volatile memory 130 (e.g., read-only memory (ROM), erasable programmable read-only memory (EPROM), electrically erasable programmable read-only memory (EEPROM), etc.), and volatile memory 132 (e.g., random-access memory (RAM)). A basic input/output system (BIOS) 134 may be stored in the non-volatile memory 130 and can include the basic routines that help to transfer information between elements within the computing device 12. The volatile memory 132 may also include a high-speed RAM, such as static RAM, for caching data.

The computing device 12 may further include or be coupled to a non-transitory computer-readable storage medium such as the storage device 38, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 38 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 38 and in the volatile memory 132, including an operating system 136 and one or more program modules, such as the IRSCV 20, which may implement the functionality described herein in whole or in part.

All or a portion of the examples may be implemented as a computer program product 138 stored on a transitory or non-transitory computer-usable or computer-readable storage medium, such as the storage device 38, which includes complex programming instructions, such as complex computer-readable program code, to cause the processor device 126 to carry out the steps described herein. Thus, the computer-readable program code can comprise software instructions for implementing the functionality of the examples described herein when executed on the processor device 126. The processor device 126, in conjunction with the IRSCV 20 in the volatile memory 132, may serve as a controller, or control system, for the computing device 12 that is to implement the functionality described herein.

The operator 42 may also be able to enter one or more configuration commands through a keyboard (not illustrated), a pointing device such as a mouse (not illustrated), or a touch-sensitive surface such as the display 50. Such input devices may be connected to the processor device 126 through an input device interface 140 that is coupled to the system bus 128 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 142 suitable for communicating via a network with the inventory master 48, computing hosts CH, and other devices appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a computing device comprising a processor device, for each respective computing host of a plurality of computing hosts, allocation information that identifies a configuration state for the respective computing host at a future point in time for creation of a respective test environment on a particular date;
   storing, by the computing device, the allocation information in a schedule data structure;
   automatically monitoring the schedule data structure over time;
   based on a current point in time, determining that a computing host of the plurality of computing hosts is to be configured from a current configuration state to a subsequent configuration state identified in the schedule data structure;
   automatically causing the computing host to be configured from the current configuration state to the subsequent configuration state; and
   presenting on a display device, based on the schedule data structure, a heat-map visualization image that identifies schedule information for each computing host of the plurality of computing hosts for a range of successive dates, the heat-map visualization image comprising:
      a grid of cells, each cell representing a computing host for a particular date in the range of successive dates; and
      date information that identifies the particular date associated with each cell in the grid of cells; and
      wherein each cell has a unique visual characteristic that identifies a particular test environment of a plurality of different test environments to which the corresponding computing host is associated with on the corresponding particular date, at least some of the different test environments comprising more than one computing host.

2. The method of claim 1 further comprising:
   receiving, for a subset of computing hosts of the plurality of computing hosts, allocation information that identifies that each computing host in the subset of computing hosts is to be configured to form a test environment at a future point in time; and
   at the future point in time, automatically causing each respective computing host in the subset of computing hosts to be configured from a current configuration state to a subsequent configuration state to form the test environment identified in the schedule data structure.

3. The method of claim 2 wherein automatically causing each respective computing host in the subset of computing hosts to be configured from the current configuration state to the subsequent configuration state comprises:
   generating, for each computing host in the subset of computing hosts, a plurality of commands; and
   communicating the plurality of commands to an inventory master that configures each computing host in the subset of computing hosts in accordance with the plurality of commands to form the test environment.

4. The method of claim 3 further comprising:
   communicating, to the inventory master, a plurality of user identifiers and corresponding passwords that define user access rights to the test environment;
   for each respective user identifier of the plurality of user identifiers, sending a command to a respective computing host in the subset of computing hosts using the respective user identifier and the corresponding password;
   receiving a response to the command; and
   based on the response, determining that the respective user identifier and the corresponding password are properly configured for the test environment.

5. The method of claim 3 further comprising validating that the inventory master correctly configured each computing host in the subset of computing hosts.

6. The method of claim 5 wherein validating that the inventory master correctly configured each computing host in the subset of computing hosts comprises, for each respective computing host:
   requesting, from the inventory master, a build state of the respective computing host; and
   based on a response from the inventory master, determining that the respective computing host has been correctly configured.

7. The method of claim 2 further comprising:
   for each respective computing host in the subset of computing hosts:
      determining an allocated internet protocol (IP) address of the respective computing host;
      sending a command to the respective computing host using the allocated IP address;
      receiving a response to the command from the respective computing host; and
      based on the response, determining that the allocated IP address of the respective computing host has been properly configured for use by the respective computing host.

8. The method of claim 1 further comprising:
   receiving, for at least one respective computing host of the plurality of computing hosts, allocation information that identifies a different configuration state for the at least one respective computing host at a plurality of future points in time;
   storing the allocation information in the schedule data structure;
   automatically monitoring the schedule data structure over a period of time that encompasses the plurality of future points in time;
   based on the schedule data structure as each future point in time of the plurality of future points in time becomes a current point in time:
      determining that the at least one respective computing host of the plurality of computing hosts is to be configured from a current configuration state associated with a first test environment to a subsequent configuration state associated with a second test environment; and
      automatically causing the at least one respective computing host to be configured from the current configuration state associated with the first test environment to the subsequent configuration state associated with the second test environment.

9. The method of claim 1 further comprising generating, for each respective cell, cell data that identifies the test environment corresponding to the respective cell, and an owner associated with the test environment, the cell data configured to be presented on a display in response to a selection of the respective cell by an input device.

10. The method of claim 1 further comprising repeatedly generating, for each respective computing host, data that identifies a current configuration of the respective computing host, the current configuration including a host name of the respective computing host, a test environment to which the respective computing host belongs, and a current IP address of the respective computing host.

11. A computing device, comprising:
a memory;
a processor device coupled to the memory to:
  receive, for each respective computing host of a plurality of computing hosts, allocation information that identifies a configuration state for the respective computing host at a future point in time for creation of a respective test environment on a particular date;
  store the allocation information in a schedule data structure;
  automatically monitor the schedule data structure over time;
  based on a current point in time, determine that a computing host of the plurality of computing hosts is to be configured from a current configuration state to a subsequent configuration state identified in the schedule data structure;
  automatically cause the computing host to be configured from the current configuration state to the subsequent configuration state;
  present on a display device, based on the schedule data structure, a heat-map visualization image that identifies schedule information for each computing host of the plurality of computing hosts for a range of successive dates, the heat-map visualization image comprising:
    a grid of cells, each cell representing a computing host for a particular date in the range of successive dates; and
    date information that identifies the particular date associated with each cell in the grid of cells; and
    wherein each cell has a unique visual characteristic that identifies a particular test environment of a plurality of different test environments to which the corresponding computing host is associated with on the corresponding particular date, at least some of the different test environments comprising more than one computing host.

12. The computing device of claim 11 wherein the processor device is further to:
  receive, for a subset of computing hosts of the plurality of computing hosts, allocation information that identifies that each computing host in the subset of computing hosts is to be configured to form a test environment at a future point in time; and
  at the future point in time, automatically cause each respective computing host in the subset of computing hosts to be configured from a current configuration state to a subsequent configuration state to form the test environment identified in the schedule data structure.

13. The computing device of claim 12 wherein the processor device is further to:
  for each respective computing host in the subset of computing hosts:
    determine an allocated internet protocol (IP) address of the respective computing host;
    send a command to the respective computing host using the allocated IP address;
    receive a response to the command from the respective computing host; and
    based on the response, determine that the allocated IP address of the respective computing host has been properly configured for use by the respective computing host.

14. The computing device of claim 11 wherein the processor device is further to:
  receive, for at least one respective computing host of the plurality of computing hosts, allocation information that identifies a different configuration state for the at least one respective computing host at a plurality of future points in time;
  store the allocation information in the schedule data structure;
  automatically monitor the schedule data structure over a period of time that encompasses the plurality of future points in time;
  based on the schedule data structure as each future point in time of the plurality of future points in time becomes a current point in time:
    determine that the at least one respective computing host of the plurality of computing hosts is to be configured from a current configuration state associated with a first test environment to a subsequent configuration state associated with a second test environment; and
    automatically cause the at least one respective computing host to be configured from the current configuration state associated with the first test environment to the subsequent configuration state associated with the second test environment.

15. A computer program product stored on a non-transitory computer-readable storage medium and including instructions to cause a processor device to:
  receive, for each respective computing host of a plurality of computing hosts, allocation information that identifies a configuration state for the respective computing host at a future point in time for creation of a respective test environment on a particular date;
  store the allocation information in a schedule data structure;
  automatically monitor the schedule data structure over time;
  based on a current point in time, determine that a computing host of the plurality of computing hosts is to be configured from a current configuration state to a subsequent configuration state identified in the schedule data structure;
  automatically cause the computing host to be configured from the current configuration state to the subsequent configuration state; and
  present on a display device, based on the schedule data structure, a heat-map visualization image that identifies schedule information for each computing host of the plurality of computing hosts for a range of successive dates, the heat-map visualization image comprising:
    a grid of cells, each cell representing a computing host for a particular date in the range of successive dates; and
    date information that identifies the particular date associated with each cell in the grid of cells; and
    wherein each cell has a unique visual characteristic that identifies a particular test environment of a plurality of different test environments to which the corresponding computing host is associated with on the corresponding particular date, at least some of the different test environments comprising more than one computing host.

16. The computer program product of claim 15 wherein the instructions further cause the processor device to:
  receive, for a subset of computing hosts of the plurality of computing hosts, allocation information that identifies that each computing host in the subset of computing hosts is to be configured to form a test environment at a future point in time; and at the future point in time, automatically cause each respective computing host in the subset of computing hosts to be configured from a current configuration state to a subsequent configuration state to form the test environment identified in the schedule data structure.

17. The computer program product of claim 16 wherein the instructions further cause the processor device to:

for each respective computing host in the subset of computing hosts:

determine an allocated internet protocol (IP) address of the respective computing host;

send a command to the respective computing host using the allocated IP address;

receive a response to the command from the respective computing host; and based on the response, determine that the allocated IP address of the respective computing host has been properly configured for use by the respective computing host.

18. The computer program product of claim 15 wherein the instructions further cause the processor device to:

receive, for at least one respective computing host of the plurality of computing hosts, allocation information that identifies a different configuration state for the at least one respective computing host at a plurality of future points in time;

store the allocation information in the schedule data structure;

automatically monitor the schedule data structure over a period of time that encompasses the plurality of future points in time;

based on the schedule data structure as each future point in time of the plurality of future points in time becomes a current point in time:

determine that the at least one respective computing host of the plurality of computing hosts is to be configured from a current configuration state associated with a first test environment to a subsequent configuration state associated with a second test environment; and automatically cause the at least one respective computing host to be configured from the current configuration state associated with the first test environment to the subsequent configuration state associated with the second test environment.

* * * * *